(12) United States Patent
Anderson

(10) Patent No.: US 8,258,959 B2
(45) Date of Patent: Sep. 4, 2012

(54) ACTIVATION CIRCUIT FOR SEALED ELECTRONIC DEVICE

(75) Inventor: Joshua D. Anderson, Greenville, TX (US)

(73) Assignee: L3 Communications Integrated Systems, L.P., Greenville, TX (US)

(*) Notice: Subject to any disclaimer, the term of this patent is extended or adjusted under 35 U.S.C. 154(b) by 789 days.

(21) Appl. No.: 12/347,145

(22) Filed: Dec. 31, 2008

(65) Prior Publication Data
US 2010/0164742 A1 Jul. 1, 2010

(51) Int. Cl.
G08B 13/14 (2006.01)
G08B 1/08 (2006.01)
H04M 1/00 (2006.01)

(52) U.S. Cl. ............. 340/572.8; 340/539.1; 340/539.22; 455/574

(58) Field of Classification Search .................. None
See application file for complete search history.

(56) References Cited

U.S. PATENT DOCUMENTS

| | | | |
|---|---|---|---|
| 3,737,857 A * | 6/1973 | Carman | 367/197 |
| 4,218,763 A * | 8/1980 | Kelley et al. | 340/429 |
| 4,598,275 A * | 7/1986 | Ross et al. | 340/573.4 |
| 4,682,155 A * | 7/1987 | Shirley | 340/573.4 |
| 5,842,118 A * | 11/1998 | Wood, Jr. | 455/101 |
| 6,111,508 A * | 8/2000 | Ensor et al. | 340/573.2 |
| 6,166,643 A * | 12/2000 | Janning et al. | 340/573.3 |
| 6,480,699 B1 * | 11/2002 | Lovoi | 455/41.2 |
| 6,575,120 B1 * | 6/2003 | Stapelfeld et al. | 119/720 |
| 6,771,613 B1 * | 8/2004 | O'Toole et al. | 370/277 |
| 7,049,932 B2 * | 5/2006 | French et al. | 340/7.1 |
| 7,512,396 B2 * | 3/2009 | Han et al. | 455/343.1 |
| 7,545,256 B2 * | 6/2009 | O'Toole et al. | 340/10.2 |
| 2002/0036569 A1 * | 3/2002 | Martin | 340/573.1 |
| 2003/0034887 A1 * | 2/2003 | Crabtree et al. | 340/539 |
| 2003/0104848 A1 * | 6/2003 | Brideglall | 455/574 |
| 2006/0139168 A1 * | 6/2006 | Pratt et al. | 340/539.22 |
| 2010/0148983 A1 * | 6/2010 | Huxley et al. | 340/815.4 |

OTHER PUBLICATIONS

Article entitled "Turn-on circuits based on standard CMOS technology for active RFID labels." Authors: David Hall, Damith C. Ranasinghe, Behnam Jamali, Peter H. Cole; School of Electrical & Electronic Engineering, University of Adelaide, SA, Australia 5005 (11 pages).

Presentation entitled "Turn-on circuits based on standard CMOS technology for active RFID labels." Authors: David Hall, Damith Ranasinghea, Behnam Jamali, Peter Cole; School of Electrical & Electronic Engineering, University of Adelaide, SA, Australia 5005 (9 pages).

* cited by examiner

*Primary Examiner* — Daniel Wu
*Assistant Examiner* — Emily C Terrell
(74) *Attorney, Agent, or Firm* — Hovey Williams LLP

(57) ABSTRACT

An environmentally sealed electronic device with an internal activation circuit that does not require a constant interrogation signal to maintain power to its internal circuitry. The electronic device includes sensor circuitry for gathering or sensing data; an internal battery for powering the sensor circuitry; and an internal activation circuit for activating the sensor circuitry. The sensor circuitry may include a temperature sensor, a location sensor, a signal sensor, a sound detector, a motion sensor, or any other device that senses or gathers data. The battery may be any type of energy storage device such as a lithium or alkaline battery. The activation circuit includes a receiver for receiving a radio frequency signal from an external source and a switch for connecting the battery to the sensor circuitry in response to the receiver. The switch is operable to maintain connection of the battery to the sensor circuitry after the radio frequency signal ceases.

14 Claims, 2 Drawing Sheets

ACTIVATION CIRCUIT FOR SEALED ELECTRONIC DEVICE

BACKGROUND

The present invention relates to data acquisition devices. More particularly, the invention relates to an environmentally sealed data acquisition device with an internal activation circuit.

Many sensors and other data acquisition devices are intended for outdoor use or in other harsh environments and therefore must be hermetically or environmentally sealed to prevent unwanted entry of water and other contaminants. Ideally, these devices should contain no external on/off switches or other components that could provide a pathway for contaminants. Unfortunately, the lack of an external on/off switch prevents easy activation of the devices once they are ready to be used.

Passive radio frequency identification (RFID) devices solve this problem by powering their internal circuits with current induced by an external interrogation device. Although this eliminates the need for an external on-off switch and an internal battery, these devices are not useful for applications requiring remote and/or longer-lasting sensing because they only remain activated while in the presence of an interrogation signal. Moreover, these devices typically have very short interrogation and transmission ranges, further limiting their use in applications requiring remote sensing.

Active RFID devices are sometimes preferred over passive RFID devices because they include their own internal batteries and therefore can acquire data without the constant presence of an external interrogation signal. Unfortunately, however, active RFID devices either require an external on/off switch to activate their batteries, which makes them difficult to seal as described above, or include circuits that are constantly on, resulting in premature battery discharge.

Turn-on circuits for active RFID devices have been proposed to solve some of the above-described problems, but such turn-on circuits still require the constant presence of an external interrogation signal. Once the external interrogation signal is removed, the internal circuits of these devices are turned off, thus limiting their use in applications requiring remote and longer-lasting sensing.

SUMMARY

The present invention solves the above-described problems and provides a distinct advance in the art of data acquisition devices. More particularly, the present invention provides an environmentally sealed electronic device with an internal activation circuit that activates the device without an external on/off switch and that does not require a constant interrogation signal to maintain power to its internal circuitry.

One exemplary embodiment of the invention comprises sensor circuitry for gathering or sensing data; an internal battery for powering the sensor circuitry; and an internal activation circuit for activating the sensor circuitry. The sensor circuitry may include any device or circuit that senses or gathers data such as a temperature sensor, a location sensor, a signal sensor, a sound detector, or a motion sensor. The battery may be any type of energy storage device such as a lithium or alkaline battery.

One embodiment of the activation circuit comprises a receiver for receiving a radio frequency signal from an external source and a switch for connecting the battery to the sensor circuitry in response to the receiver. The receiver detects radio frequency signals and triggers the switch upon detection of a particular signal. The receiver may include a band pass filter for passing only selected frequencies of the RF signal and attenuating frequencies outside the selected frequency. The activation circuit may also include a decoder for decoding the received radio frequency signals and activating the switch only when a particular code is detected.

The switch is operable to connect the battery to the sensor circuitry when triggered by the receiver and to maintain this connection after the radio frequency signal ceases. In a particular embodiment, the switch comprises a transistor circuit including a transistor and a loopback connection between the transistor emitter and the transistor base. The loopback connection may comprise a loopback resistor, a transformer, and/or other components for delivering a sufficiently high voltage signal to the base of the transistor.

The sensor circuitry, internal battery, and activation circuit are preferably housed within an enclosure having no external on/off switch or other components that could provide a pathway for water or other contaminants. The device is therefore particularly useful in applications subject to harsh environments.

The particular components illustrated and described herein are merely examples of components that may be used to implement the present invention and may be replaced with other components without departing from the scope of the invention.

These and other important aspects of the present invention are described more fully in the detailed description below.

BRIEF DESCRIPTION OF THE DRAWING FIGURES

Embodiments of the present invention are described in detail below with reference to the attached drawing figures, wherein.

Figure 1:
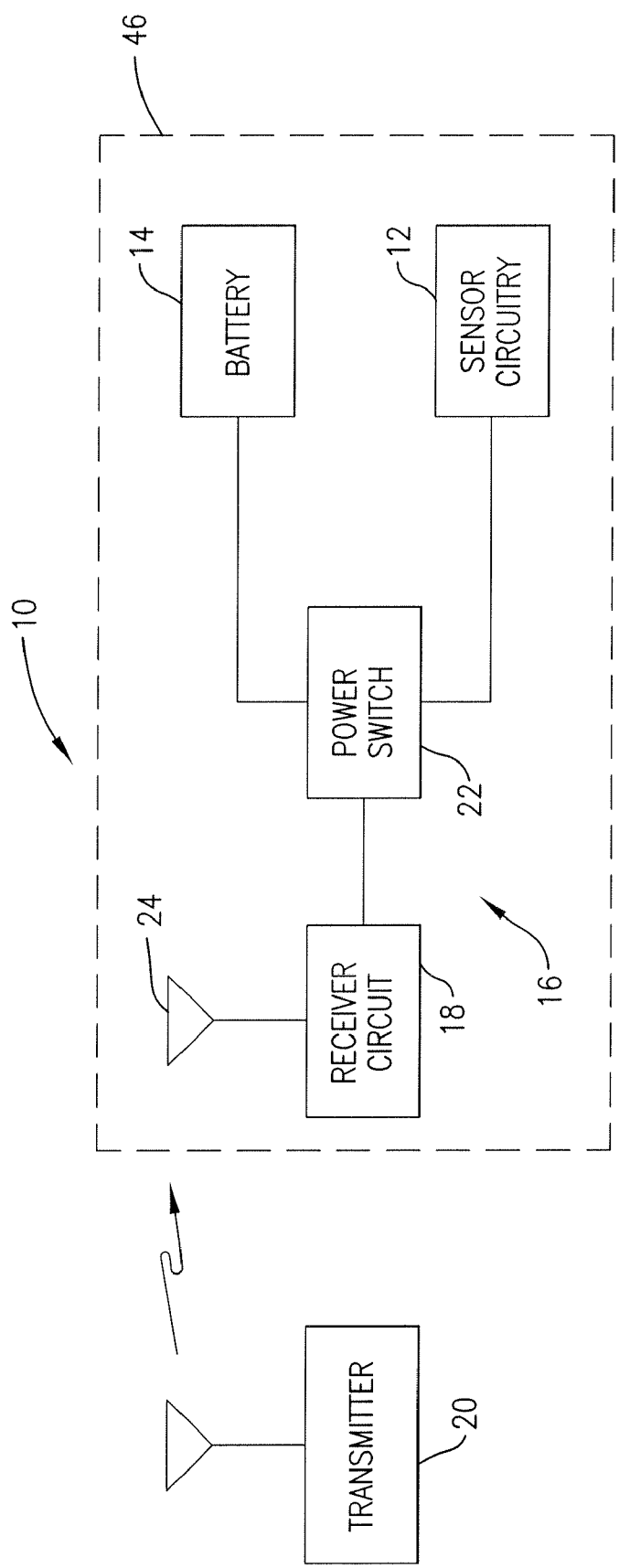
FIG. 1 is a block diagram of a data acquisition device constructed in accordance with an embodiment of the invention shown with a remote transmitter.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

Turning now to the drawing figures, and particularly FIG. 1, a data acquisition device broadly referred to by the numeral 10 and constructed in accordance with a preferred embodiment of the invention is illustrated. The data acquisition device 10 is operable for acquiring data of any type and broadly comprises sensor circuitry 12 for gathering or sensing data; an internal battery 14 for powering the sensor circuitry; and an internal activation circuit 16 for activating the sensor circuitry.

In more detail, the sensor circuitry 12 may include any device that senses or gathers data such as a temperature sensor, a location sensor, a signal sensor, a sound detector, or a motion sensor. The sensor circuitry 12 may also include other components that store, transmit, or otherwise manipulate the gathered data. For example, in one embodiment, the sensor circuitry 12 may include a temperature sensor and memory for sensing and storing multiple temperature readings over a period of time. In another embodiment, the sensor circuitry 12 may include a GPS, GLONASS, or GALILEO enabled receiver, memory, and other related circuitry for sensing and storing multiple location coordinates of the device 10 over a period of time. In yet another embodiment, the sensor circuitry 12 may include a signal sensor and memory for sensing and recording communication signals. The scope of the invention is not limited to these particular examples of the sensor circuitry, as any other sensors and sensor technology may be incorporated in the device 10.

The battery 14 may be any type of energy storage device such as a lithium battery, atomic battery, alkaline battery, or even a paper battery. Because an embodiment of the device 10 is environmentally sealed, the battery is preferably a single-use, non-rechargeable battery.

One embodiment of the activation circuit 16 comprises a receiver circuit 18 for receiving a radio frequency signal from an external transmitter 20 or other signal source and a power switch 22 for connecting the battery 14 to the sensor circuitry 12 when the receiver circuit 18 receives a particular external signal. The receiver circuit 18 may include an antenna 24 and any conventional circuitry for sensing or detecting radio frequency (RF) signals, satellite signals, microwave signals, cell phone signals, or other wireless signals from the transmitter 20 or other signal source. Likewise, the transmitter 20 may be configured to transmit any wireless signals that can be detected by the receiver circuit 18. The transmitter 20 and receiver 18 are preferably capable of long-range communication so that the device 10 may be activated from long distances.

Figure 2:
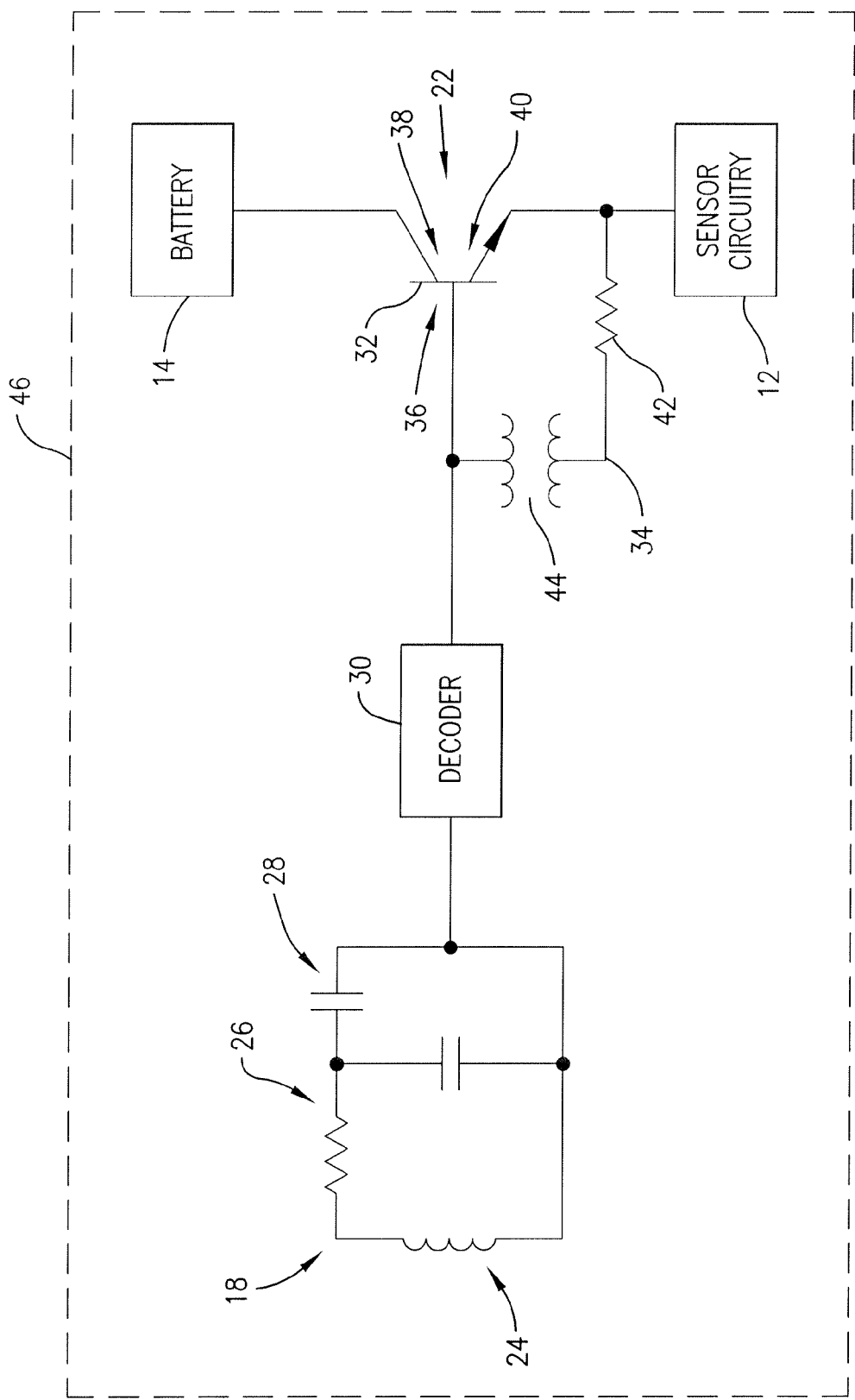
FIG. 2 is a simplified block and circuit diagram of a particular embodiment of the data acquisition device.

As illustrated in FIG. 2, the receiver circuit 18 may include a band pass filter for passing only selected frequencies of received signals and attenuating frequencies outside the selected frequencies. The band pass filter may include a low-pass filter section 26 for blocking frequencies that are too high and a high-pass filter section 28 for blocking frequencies that are too low. This prevents accidental activation of the device 10 by unrelated RF or other external signals.

In one embodiment, the transmitter 20 transmits encoded signals to the receiver circuit 18, and the activation circuit includes a decoder 30 for decoding the signals. The receiver circuit 18 thus collects energy from the transmitted signals, passes particular frequencies of the signals, decodes the signals, and activates the switch 22 only when a particular code is detected.

The power switch 22 connects the battery 14 to the sensor circuitry 12 when the receiver circuit 18 detects a properly coded signal and maintains this connection after the radio frequency signal ceases. In a particular embodiment, the switch 22 comprises a transistor circuit including a transistor 32 and a loopback connection 34. As shown in FIG. 2, the base 36 of the transistor 32 is connected to the receiver circuit 18, the collector 38 of the transistor 32 is coupled with the battery 14, and the emitter 40 of the transistor 32 is connected to the sensor circuitry 12. When sufficient voltage is applied to the base 36, the transistor switches power from the battery 14 to the sensor circuitry 12. The loopback connection 34 is connected between the emitter 40 and the base 36 for maintaining the connection between the battery and the sensor circuitry after the radio frequency signal ceases. The loopback connection may comprise a loopback resistor 42, a transformer 44, and/or other components for delivering a sufficiently high voltage signal to the base of the transistor.

The device 10 may also include a processor or other computing device for calculating results and/or other information based on the collected data, a transmitter for transmitting collected data to another device, and/or other components and circuitry.

The sensor circuitry, internal battery, and activation circuit are housed within an enclosure 46 having no external on/off switch or other components that could provide a pathway for water or other contaminants. The enclosure 46 may be of any size and constructed of any suitable materials. In some embodiments, the components of the device 10 may be mounted in an enclosure that also houses other tracking, surveillance, data acquisition, or other similar electronic components and circuits.

Although the invention has been described with reference to the preferred embodiment illustrated in the attached drawing figures, it is noted that equivalents may be employed and substitutions made herein without departing from the scope of the invention as recited in the claims. For example, the particular components illustrated and described herein are merely examples of components that may be used to implement the present invention and may be replaced with other components without departing from the scope of the invention.

The invention claimed is:

1. An electronic device comprising:
   sensor circuitry for gathering or sensing data;
   an internal battery for powering the sensor circuitry; and
   an activation circuit for activating the sensor circuitry, the activation circuit including a receiver for receiving a wireless signal from an external source and a switch for connecting the battery to the sensor circuitry in response to the receiver, the switch being operable to maintain connection of the battery to the sensor circuitry after the wireless signal ceases, the switch comprising a transistor circuit including a transistor and a loopback connection between the transistor emitter and the transistor base, and a decoder for decoding the wireless signal and activating the switch only when a particular code is detected.

2. The electronic device as set forth in claim 1, further including an environmentally sealed enclosure for housing the sensor circuitry, the internal battery, and the activation circuit, the enclosure having no external on/off switch or other components that could provide a pathway for water or other contaminants.

3. The electronic device as set forth in claim 1, the sensor circuitry including a temperature sensor, a location sensor, a signal sensor, a sound detector, or a motion sensor.

4. The electronic device as set forth in claim 1, the receiver including a band pass filter for passing only selected frequencies of the wireless signal and attenuating frequencies outside the selected frequencies.

5. The electronic device as set forth in claim 1, further including memory for storing the data collected by the sensor circuitry.

6. The electronic device as set forth in claim 1, further including a transmitter for transmitting the data to an external receiver.

7. An electronic device comprising:
sensor circuitry for gathering or sensing data;
an internal battery for powering the sensor circuitry;
an activation circuit for activating the sensor circuitry, the activation circuit including a receiver for receiving a radio frequency signal from an external source, a switch for connecting the battery to the sensor circuitry in response to the receiver, the switch being operable to maintain connection of the battery to the sensor circuitry after the radio frequency signal ceases, the switch comprising a transistor circuit including a transistor and a loopback connection between the transistor emitter and the transistor base, and a decoder for decoding the radio frequency signal and activating the switch only when a particular code is detected; and
an environmentally sealed enclosure for housing the sensor circuitry, the internal battery, and the activation circuit, the enclosure having no external on/off switch or other components that could provide a pathway for water or other contaminants.

8. The electronic device as set forth in claim 7, the sensor circuitry including a temperature sensor, a location sensor, a signal sensor, a sound detector, or a motion sensor.

9. The electronic device as set forth in claim 7, the receiver including a band pass filter for passing only selected frequencies of the RF signal and attenuating frequencies outside the selected frequencies.

10. The electronic device as set forth in claim 7, further including memory for storing the data collected by the sensor circuitry.

11. The electronic device as set forth in claim 7, further including a transmitter for transmitting the data to an external receiver.

12. A data acquisition device comprising:
sensor circuitry for gathering or sensing data, the sensor circuitry including a temperature sensor, a location sensor, a signal sensor, a sound sensor, or a motion sensor;
an internal battery for powering the sensor circuitry;
an activation circuit for activating the sensor circuitry, the activation circuit including—
a receiver for receiving a radio frequency signal from an external source, the receiver including a band pass filter for passing only selected frequencies of the RF signal and attenuating frequencies outside the selected frequencies;
a switch for connecting the battery to the sensor circuitry in response to the receiver, the switch being operable to maintain connection of the battery to the sensor circuitry after the radio frequency signal ceases, the switch comprising a transistor circuit including a transistor and a loopback connection between the transistor emitter and the transistor base; and
a decoder for decoding the radio frequency signal and activating the switch only when a particular code is detected; and
an environmentally sealed enclosure for housing the sensor circuitry, the internal battery, and the activation circuit, the enclosure having no external on/off switch or other components that could provide a pathway for water or other contaminants.

13. The data acquisition device as set forth in claim 12, further including memory for storing the data collected by the sensor circuitry.

14. The data acquisition device as set forth in claim 12, further including a transmitter for transmitting the data to an external receiver.

* * * * *